United States Patent
Ohlfs et al.

(10) Patent No.: US 9,432,613 B2
(45) Date of Patent: *Aug. 30, 2016

(54) GRAPHIC USER INTERFACE FOR PLAYING VIDEO DATA

(75) Inventors: Keith R. Ohlfs, Redwood City, CA (US); Prasanna Ganesan, Menlo Park, CA (US)

(73) Assignee: Vudu, Inc., Sunnyvale, CA (US)

( * ) Notice: Subject to any disclaimer, the term of this patent is extended or adjusted under 35 U.S.C. 154(b) by 603 days.

This patent is subject to a terminal disclaimer.

(21) Appl. No.: 13/419,246

(22) Filed: Mar. 13, 2012

(65) Prior Publication Data

US 2012/0177340 A1    Jul. 12, 2012

Related U.S. Application Data

(63) Continuation of application No. 11/383,749, filed on May 16, 2006, now Pat. No. 8,159,959, which is a continuation-in-part of application No. 11/269,462, filed on Nov. 7, 2005, now abandoned.

(51) Int. Cl.

| | |
|---|---|
| *G06F 15/16* | (2006.01) |
| *H04L 12/26* | (2006.01) |
| *G06F 3/00* | (2006.01) |
| *H04N 5/783* | (2006.01) |
| *H04N 21/431* | (2011.01) |
| *H04N 21/432* | (2011.01) |
| *H04N 21/472* | (2011.01) |
| *H04N 21/845* | (2011.01) |
| *H04N 5/765* | (2006.01) |
| *H04N 9/804* | (2006.01) |

(52) U.S. Cl.
CPC .......... *H04N 5/783* (2013.01); *H04N 21/4312* (2013.01); *H04N 21/4314* (2013.01); *H04N 21/4325* (2013.01); *H04N 21/47202* (2013.01); *H04N 21/8455* (2013.01); *H04N 21/8456* (2013.01); *H04N 5/765* (2013.01); *H04N 9/8042* (2013.01)

(58) Field of Classification Search
CPC ................. H04L 29/06027; H04L 65/4092; H04L 65/80; H04N 5/783; H04N 21/4312; H04N 21/4314; H04N 21/4325; H04N 21/47202; H04N 21/8455; H04N 21/8456
USPC ............. 709/231; 725/39, 88, 102; 370/252; 715/719

See application file for complete search history.

(56) References Cited

U.S. PATENT DOCUMENTS

| | | | | |
|---|---|---|---|---|
| 5,884,056 | A * | 3/1999 | Steele | 715/738 |
| 6,065,050 | A * | 5/2000 | DeMoney | 709/219 |
| 6,097,878 | A * | 8/2000 | Saib | 386/297 |
| 6,134,547 | A * | 10/2000 | Huxley et al. | |
| 6,157,381 | A * | 12/2000 | Bates et al. | 715/786 |
| 6,668,377 | B1 * | 12/2003 | Dunn | 725/92 |
| 6,754,715 | B1 * | 6/2004 | Cannon et al. | 709/231 |
| 7,293,275 | B1 * | 11/2007 | Krieger et al. | 725/40 |

(Continued)

*Primary Examiner* — Ruolei Zong
(74) *Attorney, Agent, or Firm* — Bryan Cave LLP

(57) ABSTRACT

A graphic user interface is provided to facilitate a playback of a movie from any desired point. The graphic user interface includes a track bar to reflect how much time data pertaining to the movie title is available for playback. After it is determined that a current data point is being dragged along the track bar, a time corresponding to the current data point is tracked as such a subsequent playback of the movie starts right from the current data point. In one embodiment, dragging the current data point along the track bar is achieved by a scroll wheel.

20 Claims, 12 Drawing Sheets

(56) References Cited

U.S. PATENT DOCUMENTS

| | | | | |
|---|---|---|---|---|
| 7,725,828 | B1* | 5/2010 | Johnson | G11B 27/005 715/719 |
| 7,779,438 | B2* | 8/2010 | Davies | 725/32 |
| 7,945,694 | B2* | 5/2011 | Luzzatti et al. | 709/234 |
| 8,391,773 | B2* | 3/2013 | Arseneau et al. | 455/3.06 |
| 2002/0161798 | A1* | 10/2002 | Kanda et al. | 707/501.1 |
| 2003/0236906 | A1* | 12/2003 | Klemets et al. | 709/231 |
| 2004/0027371 | A1* | 2/2004 | Jaeger | G06F 3/0481 715/716 |
| 2004/0218104 | A1* | 11/2004 | Smith et al. | 348/734 |
| 2004/0267952 | A1* | 12/2004 | He et al. | 709/231 |
| 2004/0268400 | A1* | 12/2004 | Barde et al. | 725/94 |
| 2005/0216839 | A1* | 9/2005 | Salvucci | 715/723 |
| 2006/0059426 | A1* | 3/2006 | Ogikubo | 715/723 |
| 2006/0168298 | A1* | 7/2006 | Aoki et al. | 709/231 |
| 2007/0011614 | A1* | 1/2007 | Crow et al. | 715/723 |
| 2007/0162611 | A1* | 7/2007 | Yu et al. | 709/232 |
| 2011/0283199 | A1* | 11/2011 | Schuch et al. | 715/740 |
| 2013/0091301 | A1* | 4/2013 | Gibby et al. | 709/231 |

* cited by examiner

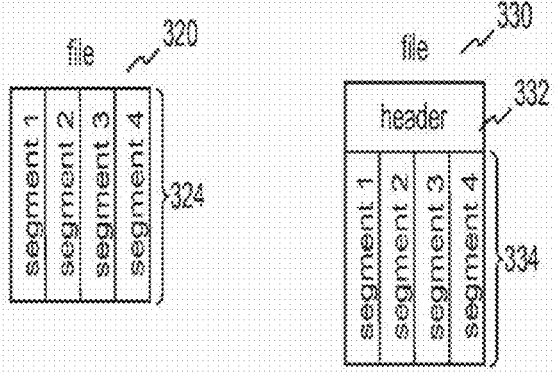
*FIG. 3B*
*FIG. 3C*
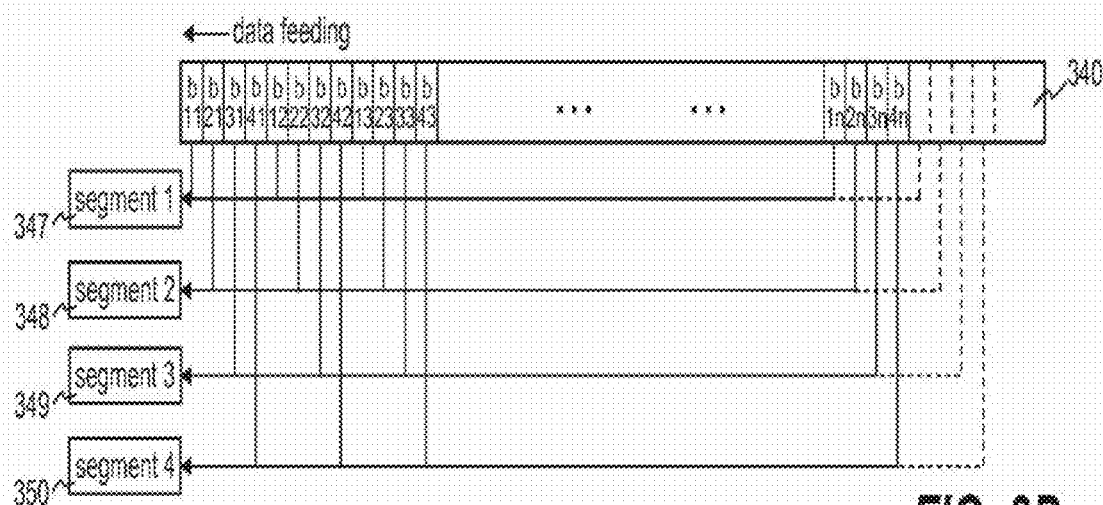
*FIG. 3D*

GRAPHIC USER INTERFACE FOR PLAYING VIDEO DATA

CROSS-REFERENCE TO RELATED APPLICATION

This application is a Continuation of U.S. patent application Ser. No. 11/383,749, filed May 16, 2006 now U.S. Pat. No. 8,159,959 which is a Continuation-In-Part of U.S. patent application Ser. No. 11/269,462, filed Nov. 7, 2005, now abandoned; all of the aforementioned priority applications are hereby incorporated by reference in their entirety for all purposes.

BACKGROUND

1. Technical Field

The present invention relates generally to the display of information on display screens. More particularly, the present invention relates to techniques for playing back video data in a manner that both fast forwarding and rewinding are not linearly performed, a user may start from any point of the view by dragging a starting point in a track bar. In addition, the present invention also relates to techniques for search a video library including many titles by genre.

2. Description of the Related Art

Both VCR and DVD players are equipped with functions for fast forwarding and rewinding. The functions for fast forwarding and rewinding are to allow viewers to simply start from a preferable point. However, a VCR player performs the functions slowly because of the limitation in reading the magnetic tapes and the fact that tapes can only be scanned sequentially. A DVD player allows a user to set up a speed (e.g., 2×, 4×, 8× and 20×) for performing fast forwarding and rewinding. In either case, a user has to be patient enough to go through portions of the video that otherwise should be skipped before reaching a desired point.

DVD players also come as software applications that typically run in a computing device with a display screen and a DVD drive. FIG. 1 shows an example of a DVD player playing back a movie. As labeled in the figure, "Eject" button is used to eject a DVD. "Rewind" is provided to rewind a DVD. When "Rewind" button is pressed, a user sees that the movie is played back in reverse at a predefined speed (e.g., 2×, 4×, 8×, or 20×). "Fast Forward" is provided to fast forward through a DVD. When "Fast Forward" button is pressed, a user sees that the movie is played back at a predefined speed (e.g., 2×, 4×, 8×, or 20×). "Stop" is provided to stop a DVD while "Play" is to play a DVD and wait for the movie from the DVD to be loaded. "Pause" is provided to pause a DVD in playback mode. In either case of "Rewind" and "Fast Forward", a user has to be patient enough to go through those that otherwise should be skipped before reaching to a desired point.

In many cases, viewers prefer to quickly jump to desired points of a movie title to examine or enjoy sections of the movie. Accordingly there is a need for a mechanism that facilitates such a nonlinear playback of a movie title. Likewise, when there is a huge library of movies, there is also a need for an interface that facilitates a fast search of a desired title.

SUMMARY

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

Broadly speaking, the present invention is related to techniques for graphic user interfaces. According to one aspect of the present invention, a graphic user interface is provided to facilitate a playback of a movie from any desired point. The graphic user interface includes a track bar to reflect how much time data pertaining to the movie title is available for playback. After it is determined that a current data point is being dragged along the track bar, a time corresponding to the current data point is tracked as such a subsequent playback of the movie starts right from the current data point. In one embodiment, dragging the current data point along the track bar is achieved by a scroll wheel.

According to still another aspect of the present invention, a graphic user interface is provided to allow a user to search an interested title among a plurality of titles by genre. In one embodiment, a list of types classifying the titles is displayed. A user is allowed to select one or more of the types to narrow down the list so that an interested title can be readily located in form of movie banners. In one embodiment, as types are being selected, the list is progressively reduced. When one of the selected types is relaxed, the list is increased. In any case, movie titles in the list fall into a category classified by either one or all of the selected types.

Other aspects of the invention will become apparent and appreciated by those skilled in the art from the detailed description herein. Embodiments of the invention may be implemented in numerous ways, including a method, system, device, or a computer readable medium. Several embodiments of the invention are discussed below. According to one embodiment, the invention is a device for displaying movies, the device comprises a memory for storing a software module, a display screen; a driver, a microprocessor, coupled to the memory, executing the software module such that the driver causes the driver to display a graphic user interface on the display screen after a movie title is selected. The graphic user interface includes a track bar to reflect how much time data pertaining to the movie title is available for playback. The software module is configured to perform operations of determining whether a current data point is being dragged along the track bar, tracking a time corresponding to the current data point once the current data point is dragged; and continuing to play back the movie title starting from the current data point.

There are many objects, features, and advantages of the present invention. These objects, features, and advantages of the present invention will become apparent upon examining the following detailed description of an embodiment thereof, taken in conjunction with the attached drawings.

BRIEF DESCRIPTION OF THE DRAWINGS

The invention will be readily understood by the following detailed description in conjunction with the accompanying drawings, wherein like reference numerals designate like structural elements, and in which:

FIG. 3B shows an embodiment in which a file is being organized or fragmented in terms of four segments;

FIG. 3C shows another embodiment in which a file is being organized or fragmented in terms of a header and four segments, where the header is always locally cached;

FIG. 3D shows that a data stream representing pertaining to a movie is being fragmented into four segments;

DETAILED DESCRIPTION OF THE INVENTION

In the following description, numerous specific details are set forth to provide a thorough understanding of the present invention. The present invention may be practiced without these specific details. The description and representation herein are the means used by those experienced or skilled in the art to effectively convey the substance of their work to others skilled in the art. In other instances, well-known methods, procedures, components, and circuitry have not been described in detail since they are already well understood and to avoid unnecessarily obscuring aspects of the present invention.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments mutually exclusive of other embodiments. Further, the order of blocks in process, flowcharts or functional diagrams representing one or more embodiments, if any, do not inherently indicate any particular order nor imply limitations in the invention.

Figure 1:
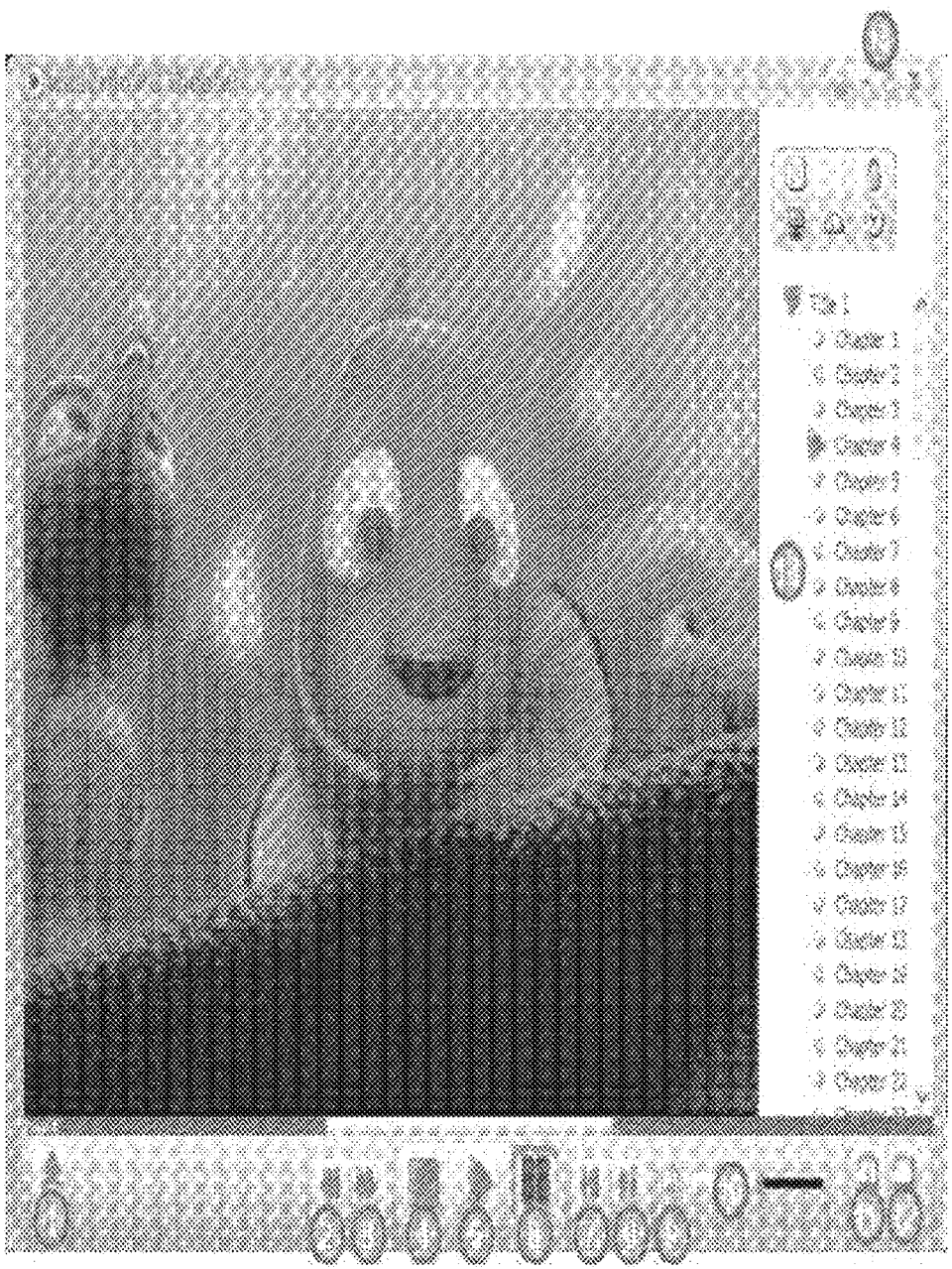
FIG. 1 shows an example of a DVD player playing back a movie.
Figure 2A:
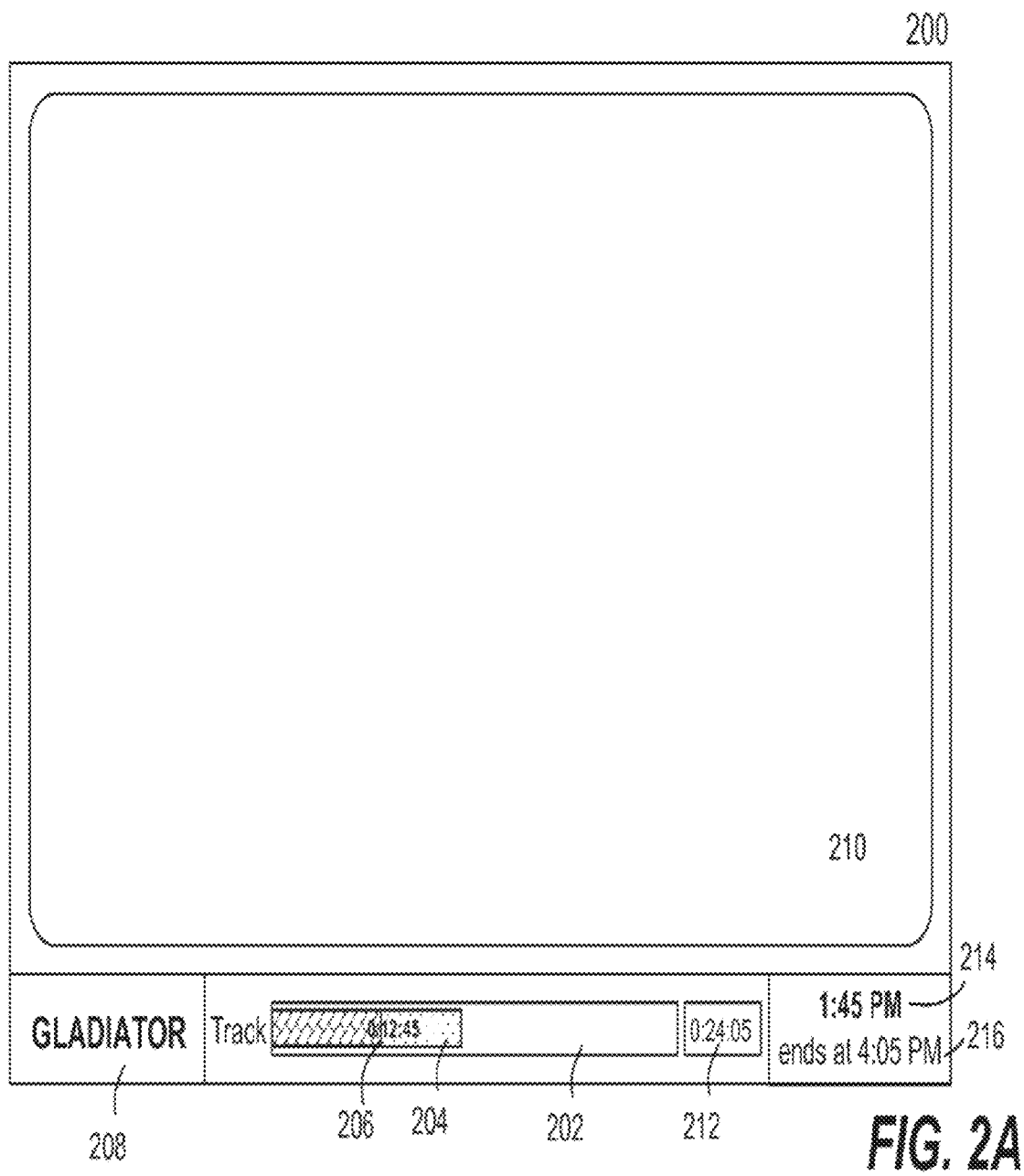
FIG. 2A shows an exemplary graphic user interface providing a track bar that shows an available data length in which a current data point indicates where current data is being played.

Referring now to the drawings, in which like numerals refer to like parts throughout the several views. FIG. 2A shows an exemplary graphic user interface 200 providing a track bar 202 that shows an available data length 204 in which a current data point 206 indicates where current data is being played. Both the data length 204 and the current data point 206 are expressed in terms of time. In one embodiment, the available data length 204 occupies the entire the track bar 202 to indicate that the movie data for the title is all locally available. In another embodiment, as will be further explained below, the movie data is concurrently being downloaded from other devices on a network, the track bar 202 is partially occupied and progressively growing over the time to indicate that the movie data is being received as streaming while the title is being played back.

Figure 2B:
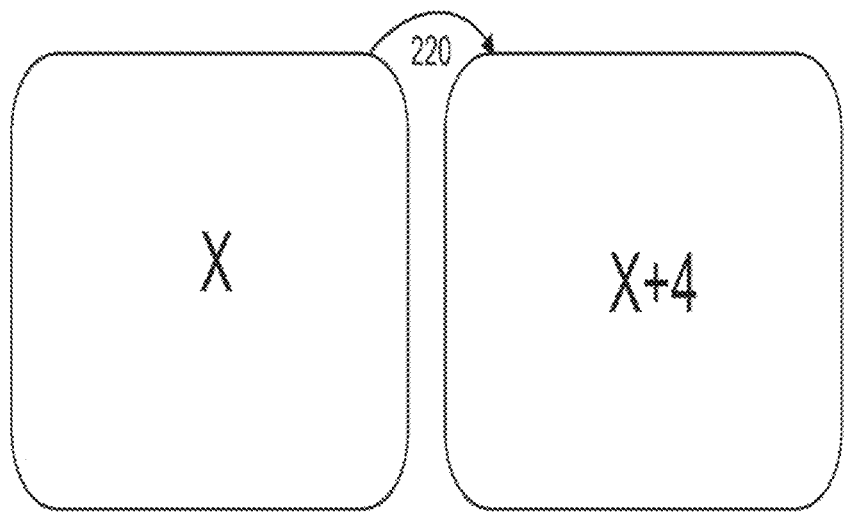
FIG. 2B shows that a current movie data point is slowly moved by the user along the track bar, but still faster than the normal playback speed, accordingly a display of the title may be shown as if the playback speed was speeded up (i.e., fast forward or rewind)
Figure 2B:
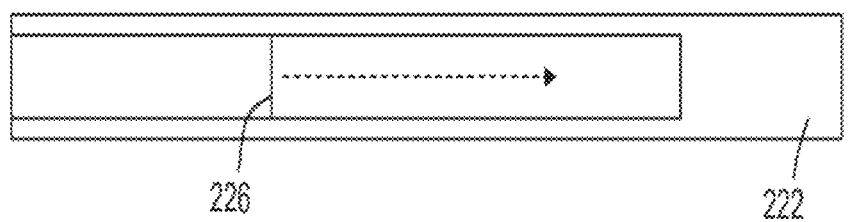
Figure 2C:
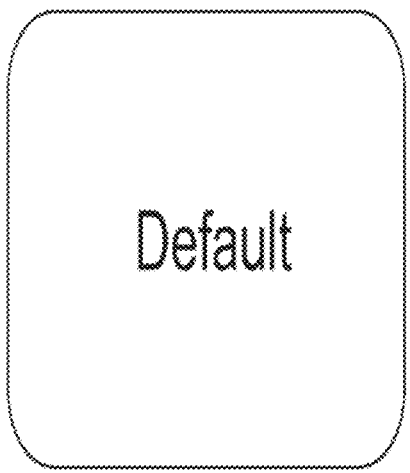
FIG. 2C shows that, If a current movie data point is moved nonlinearly or randomly by the user from point A to point B (e.g., one hour ahead in play time), a default image, such as a blue color display, is shown till point B is reached, then a full image closest to point B, is displayed.
Figure 2C:

Different from the prior art players, the graphic user interface 200 allows a user to manually drag the current data point 206 along the track bar 202 and may stop anywhere in the track bar 202. Operationally, in one embodiment, the current movie data point 206 would not be dragged beyond the available data length 204. Depending on the dragging speed and the underlying data format, the display 210 may show movie frames or a default display as the current movie data point 206 being dragged along in the track bar 202. As shown in FIG. 2B, as a current movie data point 226 is slowly moved by the user along the track bar 222, a display 220 of the title may be shown as if the playback speed was speeded up (i.e., fast forward or rewind). The speed at which the current movie data point 222 is moved may correspond to the speed at which the video is skipped forward or backward. For example, if the current movie data point is moved slowly, the video may skip every other frame in order to show a 2× speed-up. If the data point is moved faster, the video may skip many more intermediate frames in order to show a speed-up corresponding to the speed at which the data point is moved. If the current movie data point 206 is moved nonlinearly or randomly by the user to a point, as shown in FIG. 2C, from point A to point B (e.g., one hour ahead in play time), a sequence of intermediate images between A and B are shown until the data point reaches point B. If the data point moves so fast from A to B that there is very little time to show many intermediate images, a default image, such as a still picture of the video at point A is shown until the data point reaches point B. Once it reaches point B, a full image closest to point B, as will be further explained below, is displayed.

In operation, the current data point 206 may be dragged forward (to mimic a fast forward function) and backward (to mimic a rewind function). Different from the predefined playback speeds for either fast forward or rewind in a prior art system, the present invention does not require a user to set the playback speeds in fast forward or rewind, and instead allows the user to jump to any point to start or continue a playback. According to one embodiment, the movement of the current data point 206 is achieved by a scroll wheel (e.g., on a remote controller and a mouse). A user may drag the current movie data point 206 to any location in the track bar 202 by scrolling a scroll wheel. One of the advantages in the present invention is that the user does not have to wait and view all the intermediate scenes in a title and can reach a desired starting point rapidly.

Figure 3A:
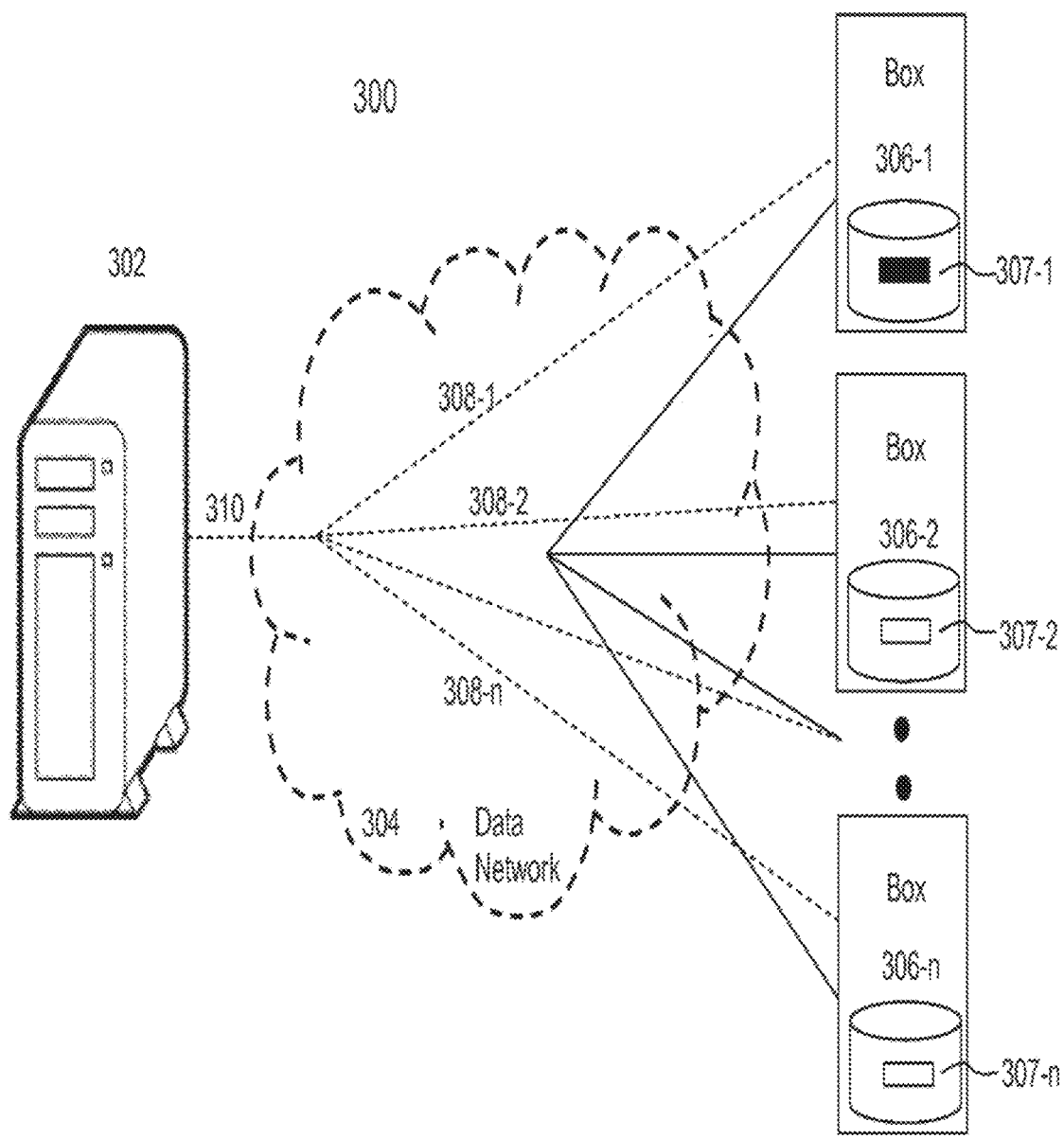
FIG. 3A shows an exemplary configuration of a distributed network system in which the present invention may be practiced.

The graphic user interface 200 also shows a movie title 208 being played, a total play time 212 for available data of the movie title 208, a current time 214 and at what time 216 the movie is supposed to end. To further understand the present invention, FIG. 3A shows an exemplary configuration of a distributed network system 300 in which the present invention may be practiced. A server 302, presumably managed and/or populated by a service provider, is configured to handle the delivery of video (or multimedia) services to users via local machines or boxes 306-1, 306-2, . . . 306-n. Different from the prior art system that delivers video data to a subscriber upon receiving a request therefrom, the server 302 is not responsible for delivering the content in response to a request from a user, and instead is configured to provide source information as to where and how to retrieve at least some of the content from other boxes. In other words, the prior art system requires at least a media storage device to provide the content when any of the client machines is being serviced, while the server 302 does not need necessarily a media storage device to provide the content. Instead, some of the boxes 306-1, 306-2, . . . 306-n are respectively configured to supply part or all of the content to each other.

According to one embodiment, when fulfilling a request from a local machine or a box 306-1, communication between the server 302 and the box 306-1 over the network paths 308-1 and 310 may be limited to small-scale requests and responses (e.g., of small size and very short). A server response to a request from a box may include source information (e.g., identifiers), authorization information and security information. Using the response from the server 302, the box 306-1 may be activated to begin playback of a title. Data representing the title may be distributed in other boxes. The data, as will be shown below, is segmented into a number of segments, each is distributed to some boxes in services. Substantially at the same time, the box 306-1 may initiate one or more requests to other boxes (e.g., 306-2 and 306-n) in accordance with the source identifiers to request the distributed segments (e.g., 307-2 and 307-n). Assuming proper authorization, the requesting box 306-1 receives the distributed segments concurrently from the other boxes.

The contents available in a library being offered in any of the boxes 306-1, 306-2, . . . 306-n are originally provided by one or more content providers. Examples of the content providers include satellite receivers, television relay stations, analog or digital broadcasting station, movie studios and Internet sites. Depending on implementation, the contents may be initially received or originated in the server 302. Instead of maintaining and managing the content in a large storage device, the server 302 is configured to distribute the content or files to a plurality of local machines registered with the server 302. The boxes 306-1, 306-2, . . . 306-n shown in FIG. 3A are examples of local machines in service. Unless there is a need for a backup copy, the server 302 at any time has no need to keep a copy of the content. On the other hand, unless there is a special need to keep a complete copy of an extremely high-demand title in a box, none of the boxes in service has a complete copy of a title until an order is placed.

Referring to FIG. 3B, there shows an embodiment in which a file 320 is being organized or fragmented in terms of four segments 324. In general, the file 320 representing a collection of all data pertaining to a title may be divided into any number of segments in consideration of a required transmission rate (e.g., related to the encoding and decoding rates for successful playback), and the minimum uploading and downloading capabilities of a network. FIG. 3C shows another embodiment in which a file 330 is being organized or fragmented in terms of a header 332 and four segments 334, where the header 332 is always locally cached. One of the advantages of having a header locally cached is to facilitate an instantaneous playback after a movie is order. While the header is being played back, the needed segments are retrieved from other designated boxes. It can be appreciated the length of a header may be predefined or dynamically determined to provide a time buffer (e.g., 5 minutes) sufficiently to retrieve part of the data from the distributed segments for assembling with that of any locally cached segments, if any. As a result, an instantaneous VOD system may be realized.

Regardless whether a header is used or not, a file or a majority of a file will be fragmented and the segments are distributed among the boxes in service. FIG. 3D shows a data stream 340 representing a file or a majority of a file. The file 340 is divided into four segments 347-350. The segments 347-350 are created or formed by respectively sampling the file in a decimated manner. As a result, each of the segments includes a plurality of data blocks. Depending on an exact data length of the file 340, an n-th data block in each of the segments 347-350 is four successive data blocks in the file. In one embodiment, a data block comprises a chunk of data, for example, 256 Kbytes or 1 Mbyte.

As shown in FIG. 3D, the data stream 340 is expressed in data blocks as follows: $b11, b21, b31, b41, b12, b22, b32, b42, b13, b23, b33, b43, \ldots b1n, b2n, b3n, b4n$. With the decimated sampling, the four segments 347-350 obtained can be respectively expressed as follows:

Segment 1={b11,b12,b13,b14 . . . b1n};

Segment 2={b21,b22,b23,b24 . . . b2n};

Segment 3={b31,b32,b33,b34 . . . b3n}; and

Segment 4={b41,b42,b43,b44 . . . b4n}, where b stands for "data block", numerals after "b" are mere reference numbers. As used above, the data blocks $b11, b21, b31, b41, b12, b22, b32, b42, b13, b23, b33, b43, \ldots b1n, b2n, b3n, b4n$ are sequential while, for example, data blocks $b11, b12, b13, b14 \ldots b1n$ in Segment 1 are not sequential.

In other words, the data blocks in each of the segments are non-consecutive. Data streams from all segments must be multiplexed to reproduce useful data for playback.

Figure 4:
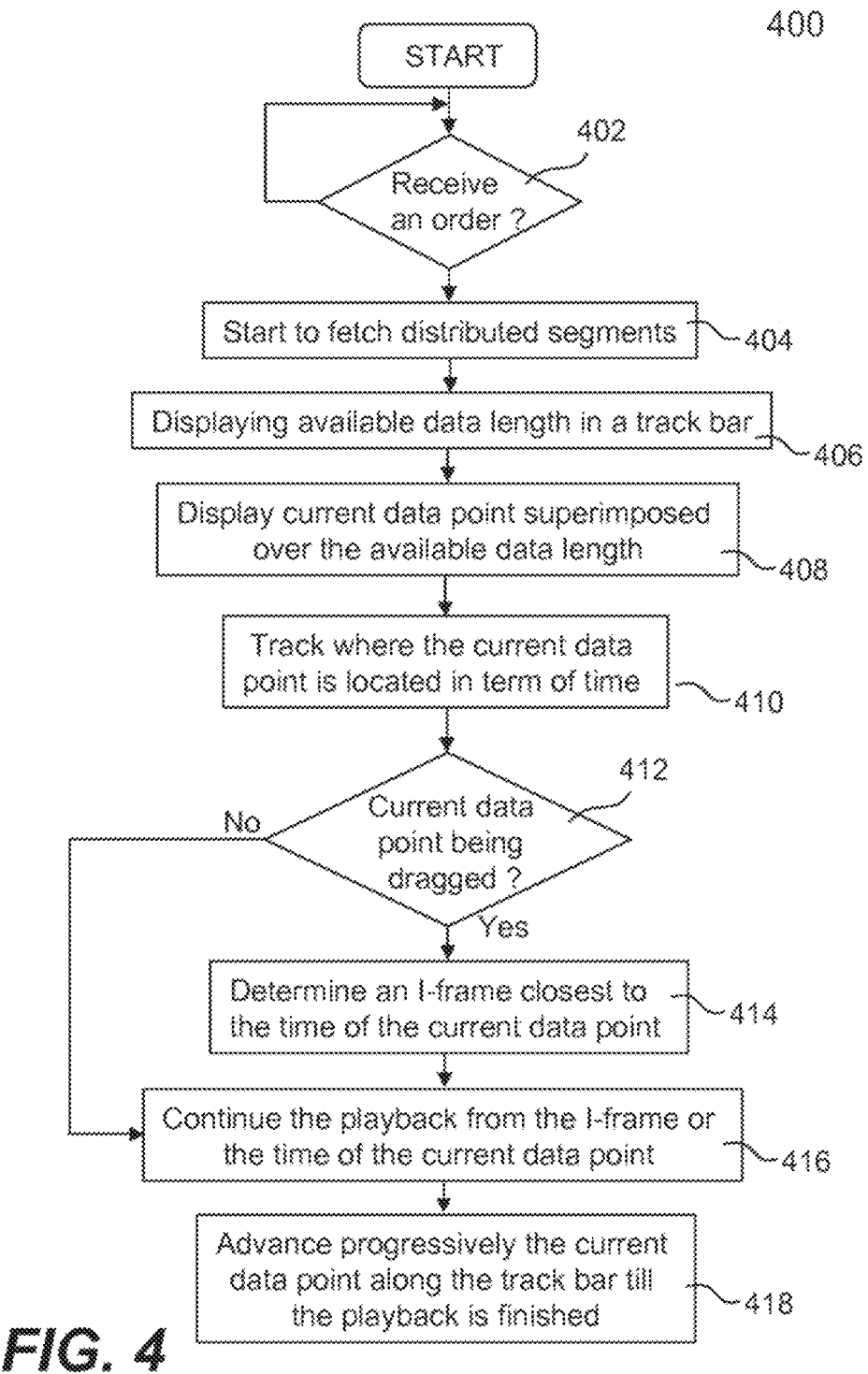
FIG. 4 shows a flowchart or process of providing a graphic user interface that allows a user to reach any desired starting point.

Referring now to FIG. 4, there shows a flowchart or process 400 of providing a graphic user interface that allows a user to reach any desired starting point. The process 400, in accordance with one embodiment, may be readily understood in conjunction with previous figures. Depending on implementation, the process 400 may be implemented in software, hardware or in combination of both as a method or a software module executing in an apparatus.

It is assumed that the process 400 is executed in a client machine or device coupled to a display screen. The device may include, but not be limited to, a set-top box, and a computing device and controlled by a remote control with a scroll wheel. The device is assumed to be coupled to a network (e.g., the Internet) and a user of the device is also assumed to have subscribed to video services with a service provider that operates a server.

Accordingly, at 402, the device awaits an order from the user. In operation, the device executes a software module that is configured to display a list of available titles or provide a search mechanism for the user to look for a desired title. It is assumed that a title is selected. The process 400 now goes to 404 where distributed segments for the selected title are started to be fetched or downloaded. In operation, a request from the device is transported to the server. The request includes information about the selected title as well as an identifier (e.g., an IP address) of the device. It is assumed that the user is authorized to access the service provided by the server, the server is configured to contact other selected devices that may locally cache those distributed segments. Typically, those that are physically close to the ordering device and have sufficient uploading bandwidth are preferably selected.

It is assumed that data for the selected file has been segmented into four segments, only one is locally cached in the ordering device, and other three segments are distributed in other devices. Thus three other devices are selected and contacted to supply the three distributed segments to the ordering device. At 404, the distributed segments are started to be fetched from the supplying devices. As the distributed data is concurrently coming, an available data length in terms of time is displayed in a track bar and progressively expanded so that the user knows when the selected title can be started. As shown in FIG. 2, once the available data length is shown, the selected title may be started. As the data being played, the current movie data point starts to be shown over the available data length at 408.

The exact time of the current data point is typically tracked at 410. As shown in FIG. 2A, the time of the current data point is also shown so that viewers know how much time the movie has been played. At 412, the process 400 determines whether the current movie data point is being dragged in the track bar (within the available data length). If the current movie data point is unchanged, the user is continuing the movie at the normal speed and sequence. If the current movie data point is changed, which means that the user has chosen a different starting point, the process 400 goes to 414 where an I-frame closest to the time of the current movie data point is determined.

It is well known in the art that there are three types of encoded frames in compressed video data, I or intra frames, P or predicted frames and B (bidirectional) frames. I frames are simply a frame coded as a still image. P frames are predicted from the most recently reconstructed I or P frame. The sequence of encoded frames usually appears like: . . . IBBPBBIBBPBBIBBPBBIB . . . where IBBPBB forms a group of pictures (GOP), referred to as S(6, 3), meaning a GOP has 6 "frames" comprising a plurality of subGOP of 3 frames, e.g. IBB or PBB. In other words, this is based on a random access requirement that one needs a starting point at least once every 0.2 seconds or so. It is known there are S(12, 3), S(15, 4) and other GOPs depending on the compressing requirement and television video format in use.

One of the reasons of locating an I-frame or a first frame in a GOP closest to the time of the current data point is to ensure that a full image is available and subsequent play can be smoothly started from the full image. Once such frame is located in the available data length at 416, the playback starts from the current movie data point. At 418, the current movie data point is progressively advanced along the track bar that is also progressively advanced as the distributed data is concurrently being fetched.

A key advantage of this graphical user interface of FIGS. 2A, 2B and 2C (which offers no "Rewind" or "Fast-forward" buttons) is that it is possible to smoothly skip forward and backward through a video even if the GOP structure does not contain frequent I frames and even if B frames cannot be dropped. A typical implementation of a smooth fast-forward or rewind mechanism requires a constrained GOP structure (such as the requirement to have at least 2 I-frames each second), so that it is possible to drop some frames in the video, decode only the rest and still produce an acceptable display. The use of the skipping feature based on the user's movement of the movie data point eliminates the need for smooth playback at a constant speed, and makes it possible to enable skipping even in video streams with very infrequent I-frames.

Figure 5A:
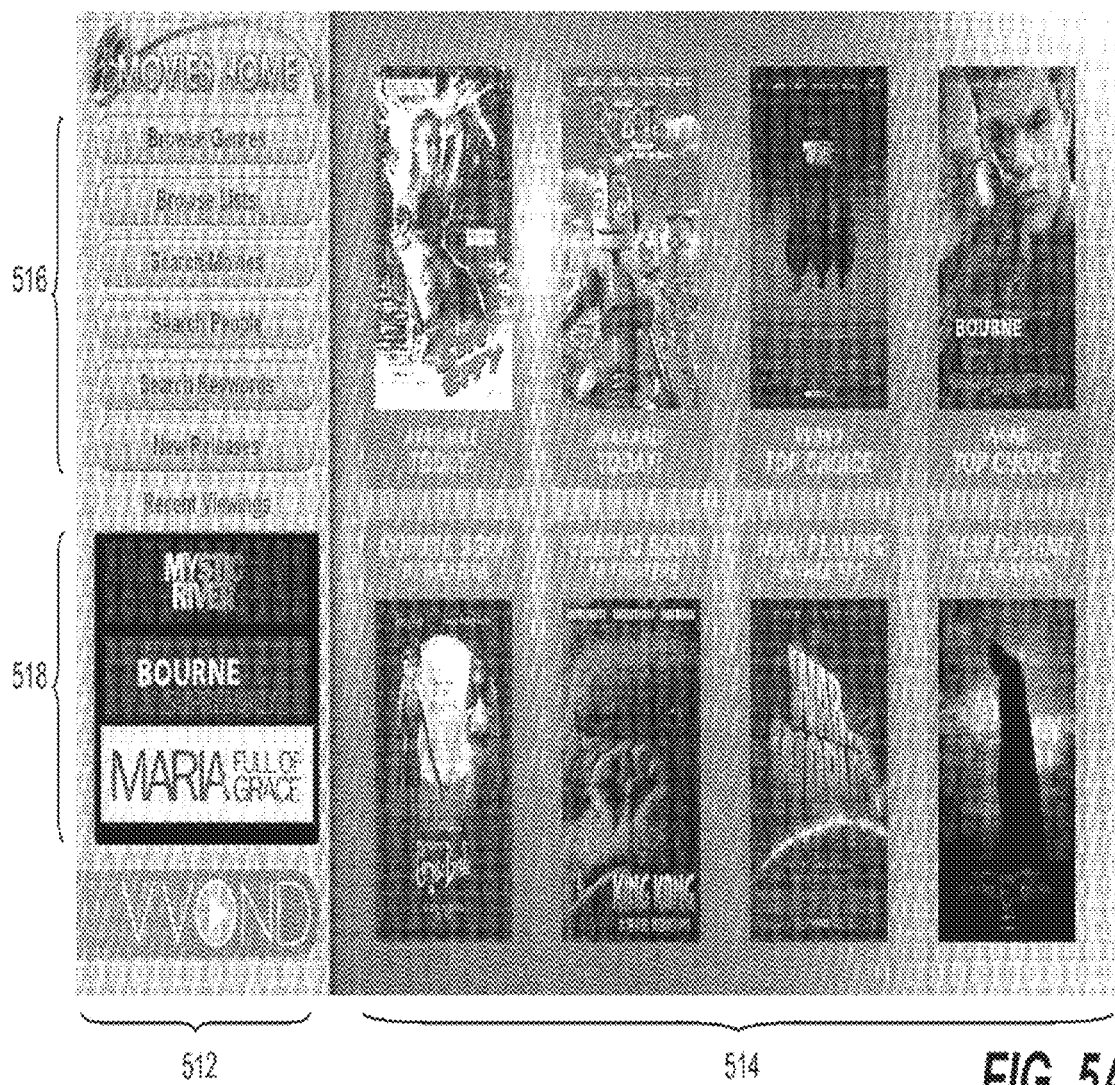
FIG. 5A shows an exemplary display, also referred to herein as a home display, that facilitates a selection of a move title by a user.

Referring now to FIG. 5A, there shows an exemplary display 510, also referred to herein as a home display, that facilitates a selection of a move title by a user. The display 510 includes a functional panel 512 and a notification space 514. The functional panel 512 includes various tools 516 the user may use to manage personalized lists and/or minor accounts if necessary, search a movie and change settings, etc. In addition, the functional panel 512 includes a list of recent movies 518 that the user has viewed.

The notification space 514 is provided to display various promotions. The embodiment as shown in the display 510 shows that there are eight movies being promoted. In another embodiment, the notification space 514 is used to advertise various services and products. These services and products may be highly related to the interests or characteristics of the account owner. When an account is established for the owner, a list of questions may be posed for the owner to answer. The answers from the owner to the questions are assembled and analyzed to determine the interests or characteristics of the owner. For example, some answers indicate that the owner is very much into golfing, the notification space 514 may be configured to display services and products somehow related to golfing. The interests or characteristics of the owner may also be determined from an analysis of the owner's behavior in interacting with the system, together with additional information provided to the system about the behavior of other owners.

According to one embodiment, the notification space 514 provides a platform for businesses to promote or advertise their respective services and products. According to one embodiment, the use of the notification space 514 or the selection of programs to be displayed in the notification space 514 may be determined through an auction process. In others words, a business willing to pay a higher price gets a higher priority to display its service/products in the notification space 514.

As shown in FIG. 5A, the movies being promoted in the notification space 514 are in the form of movie posters. One of the advantages of showing movie posters instead of titles in words is to make a coincident impact on audience as a movie poster is a single visual image representation of a movie. Movie studios or production companies, large or small, promote their movies with movie posters so that the general audience gets to know a movie quickly from a corresponding movie poster. According to one implementation, each of the displayed movie posters in the notification space 514 is embedded with a link. Once one of the displayed movie posters is selected, a full review of the movie is provided.

Figure 5B:
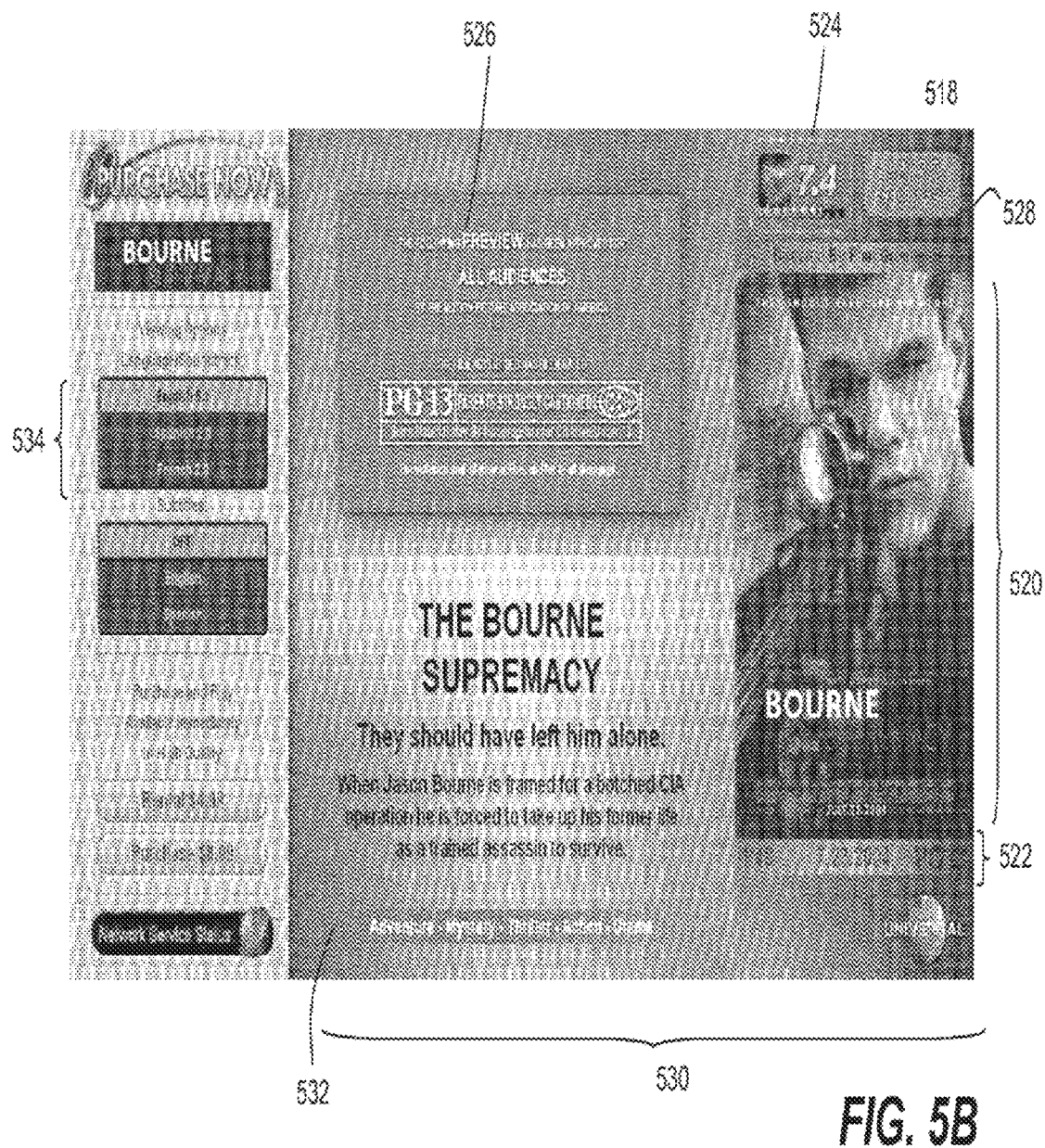
FIG. 5B shows an exemplary full review of a movie that is promoted in the notification space and selected.

FIG. 5B shows an exemplary full review 518 of a movie that is promoted in the notification space 514 and selected. The full review 518 includes a trailer 526 that can be manually or automatically played, a brief description 532 of the movie, a corresponding movie poster 520, and publication information 522 that includes an exact playing time, a publication date and a rating grade. In addition, the full review 518 includes a rating 524 by viewers who have watched the movie and a current time and an ending time 528 if the movie is ordered at the time. One of the features of the full review 518 is that various pieces of information about a movie are integrated in one display so that a user gets to know the movie by one click. Specifically, the full review 518 provides sound track information 534 that indicates how many audio languages are available for the movie. A selection of a particular sound track indicates to the server how to download the distributed data. In one embodiment, the sound track data is not fully downloaded. Instead, given a particular language requirement, only the data that supports the selected language gets downloaded into the ordering device.

Referring back to FIG. 5A, Browse Genres, Browse Lists, Search Movies, Search People, Search Keywords in the functional panel 512 provide respective mechanisms for a user to locate a movie by genres (e.g., drama), lists (e.g., a whole list), movie names (e.g., a specific title), and people (e.g., actor or director). According to one aspect of the present invention, Browse Genres provides an efficient and unique search mechanism for a user to locate a desired movie title.

Figure 6A:
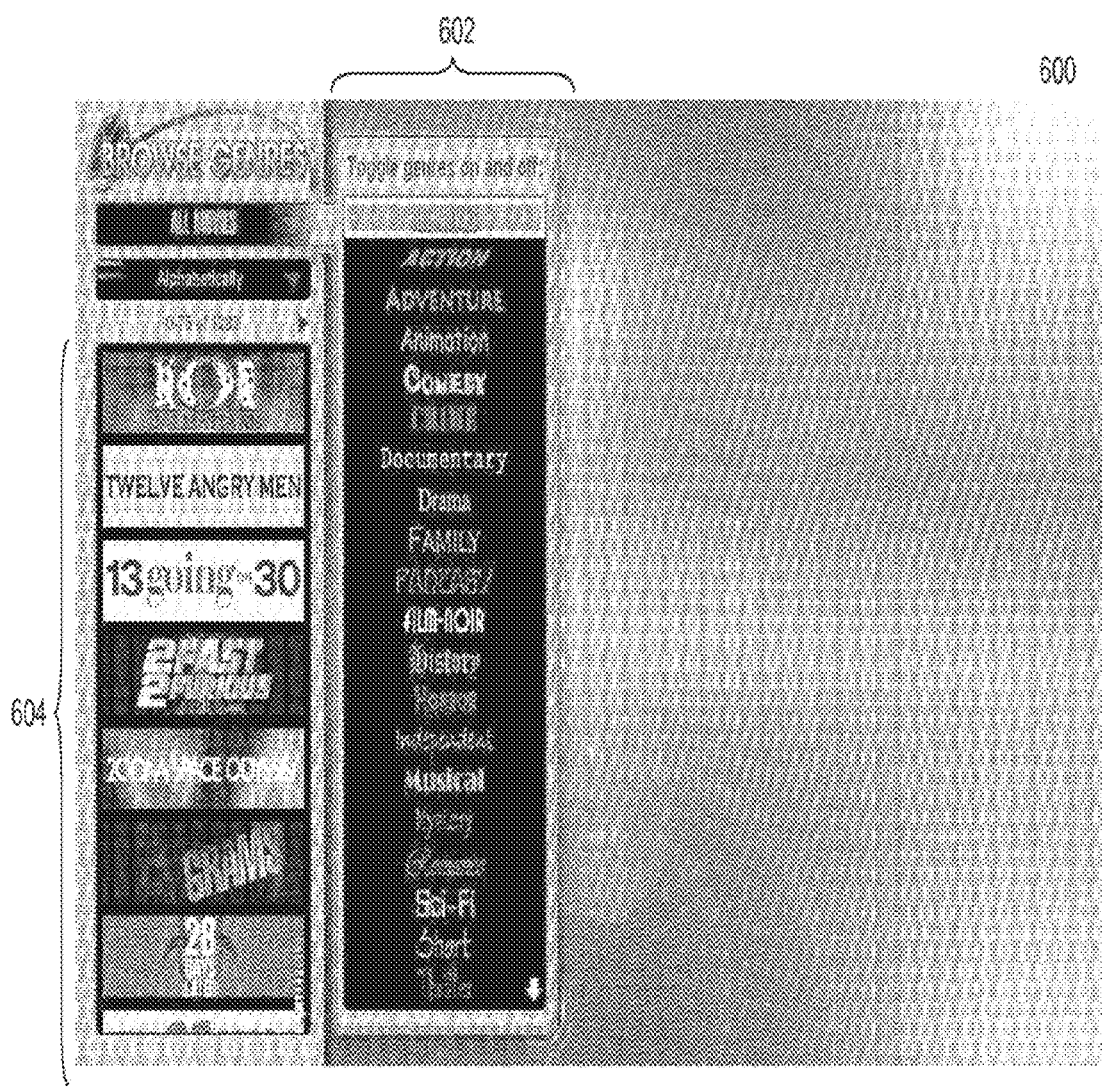
FIG. 6A shows an interface display after the user selects Browse Genres in the functional panel of FIG. 5A.

FIG. 6A shows an interface display 600 after the user selects Browse Genres in the functional panel 512 of FIG. 5A. The display 600 shows a genre table 602 and a list 604 of movie banners organized alphabetically. The list 604 of movie banners may also be organized according to other criteria, e.g., latest releases first or sorted by the system rating of the movie quality. Each of the movie banners shows a title in substantially similar style, font and background as in the corresponding movie poster. It may be appreciated by those skilled in the art that one of the features in the present invention is to create a coincident impact on the audience by using at least part of a movie poster or banner to indicate a movie. In certain aspect, a movie banner is equivalent to a visual "logo" for a movie. A user may browse or scroll the list of movie banners in the list 604. Each of the movie banners in the list 604 is embedded with a link that brings up a full review of the movie when one of the displayed movie banners is selected.

Figure 6B:
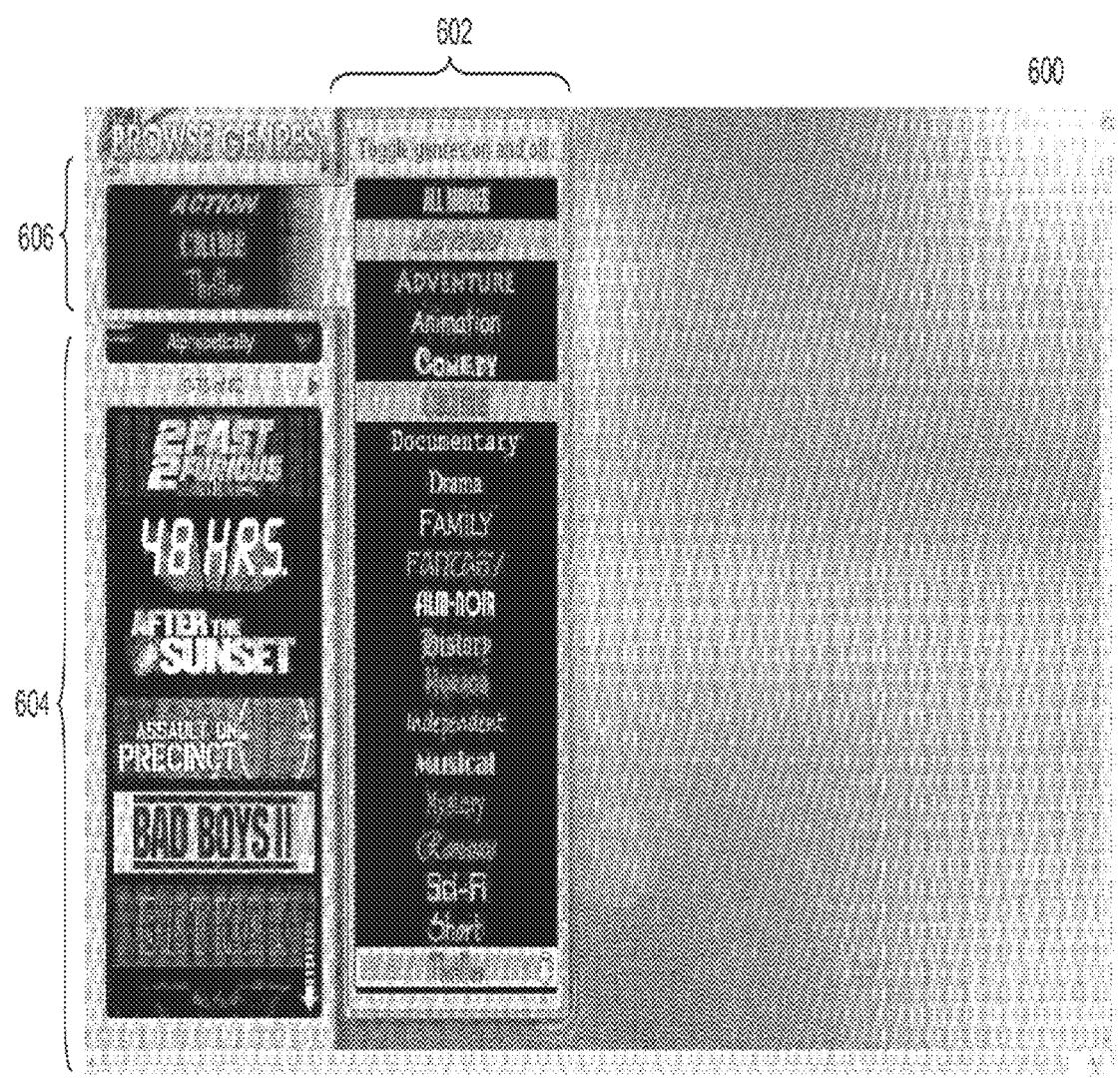
FIG. 6B shows that two types "CRIME" and "Thriller" in the genre table are selected.

Typically, the list 604 may include thousands of titles. It is not convenient or efficient to go through the list for a desired title. The genre table 602 provides a mechanism that allows a user to search in a much reduced list specified by types of titles being searched. According to one embodiment, by scrolling a scroll wheel, the user may choose one or more types in the genre table 602, only those titles in the library falling into the specified types are shown in the list 604. FIG. 6B shows that two types "CRIME" and "Thriller" in the genre table 602 are selected. As a result, the movie banners in the list 604 are significantly reduced, the list 604 now includes only those movie banners that are classified as either one of "CRIME" and "Thriller". The selection criteria window 606 shows "CRIME" or "Thriller".

Figure 6C:
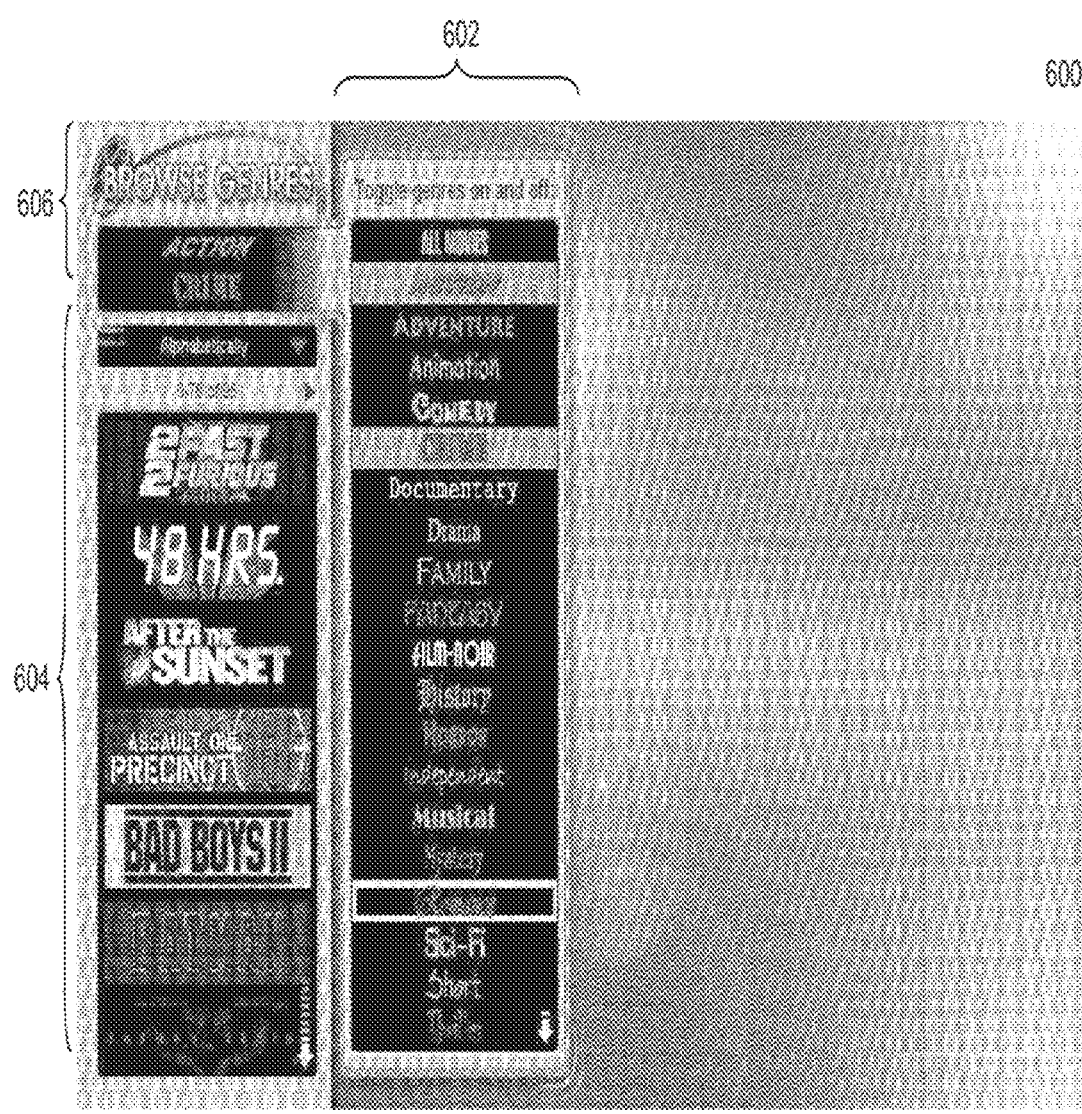
FIG. 6C shows that the selection of "Thriller" has been unselected and a selection "Romance" is being scrolled on for possible selection.

According to one embodiment, by scrolling a scroll wheel and titling the wheel left or right for activation, the selection in the genre table 602 may be unselected or unselected. A new selection may be made after scrolling to a new type and right tilting the scroll wheel. FIG. 6C shows that the selection of "Thriller" has been unselected and a selection "Romance" is being scrolled on. The selection criteria window 606 shows that only "Thriller" is being selected.

Figure 7:
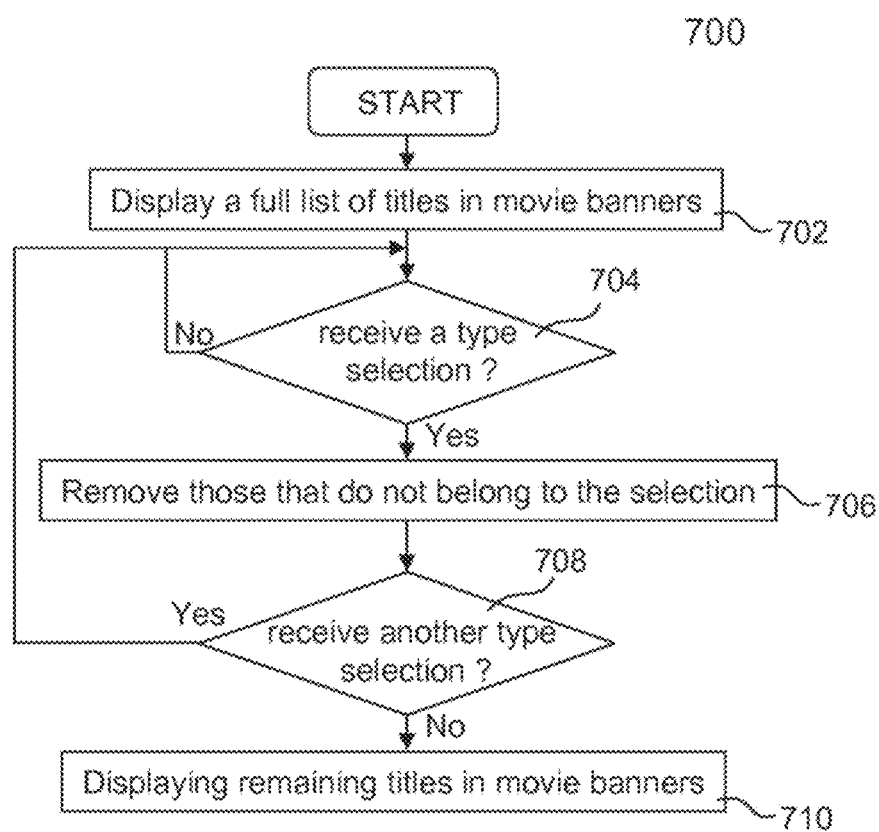
FIG. 7 shows a flowchart or process of providing a graphic user interface that allows a user to narrow down a search list by specifying one or more types.

Referring now to FIG. 7, there shows a flowchart or process 700 of providing a graphic user interface that allows a user to narrow down a search list by specifying one or more types. The process 700, in accordance with one embodiment, may be readily understood in conjunction with FIGS. 5A-6C. Depending on implementation, the process 700 may be implemented in software, hardware or in combination of both as a method or a software module executing in an apparatus.

When a user first logs into a terminal device that executes a software module implementing the process 700, a display screen displays a full list of available titles (e.g., 5000 titles) at 702. An example of such display may be referenced in FIG. 6A. It is understood that it is not convenient to go through the list for a desired item. At 704, the process 700 awaits a selection of a type of movie (e.g., Horror, Action or Drama). When a user enters a selection, the process 700 goes to 706 where the original list is filtered out, essentially, titles that do not fall into the category of the selected type by the user are removed from the list.

At 708, the process 700 checks to see if there is another type selection from the user, if there is one, the process 700 goes back to 704 to receive the selection that will further narrow down the list at 706. It is assumed that the user provides no further selection at 708, the process goes to 710 that shows the reduced list from which the user can readily select a desired title.

One skilled in the art will recognize that elements of the present invention may be implemented in software, but can be implemented in hardware or a combination of hardware and software. The invention can also be embodied as computer-readable code on a computer-readable medium. The computer-readable medium can be any data-storage device that can store data which can be thereafter be read by a computer system. Examples of the computer-readable medium may include, but not be limited to, read-only memory, random-access memory, CD-ROMs, DVDs, magnetic tape, hard disks, optical data-storage devices, or carrier wave. The computer-readable media can also be distributed over network-coupled computer systems so that the computer-readable code is stored and executed in a distributed fashion.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, FIG. 2A shows a graphic user interface that may be changed to a full display and may become shown only when needed. Accordingly, the scope of the present invention is defined by the appended claims rather than the foregoing description of embodiments.

We claim:

1. A method for displaying a video, the method being performed by a processor and comprising:
   displaying the video for a playback on a display device at a playback speed;
   providing a graphic user interface on the display device, the graphic user interface including a track bar with a current data point;
   determining a speed of the current data point being dragged along the track bar by a user via a user input mechanism; and
   in response to determining that the speed of the current data point being dragged along the track bar by the user via the user input mechanism is greater than a particular speed, displaying a default image until the current data point is no longer dragged along the track bar, and then continuing to playback the video, wherein the particular speed is at least twice the playback speed.

2. The method of claim 1, wherein the track bar provides an available data feature indicating an amount of data of the video available for the playback.

3. The method of claim 2, wherein the available data feature grows as the amount of data of the video available for the playback increases.

4. The method of claim 1, wherein displaying the video comprises streaming the video from a network.

5. The method of claim 1, wherein displaying the video comprises playing back the video that is locally stored in a memory resource.

6. The method of claim 1, wherein the graphic user interface displays a current time and a time the video is predicted to finish the playback.

7. The method of claim 1, further comprising in response to determining that the speed of the current data point is not greater than the particular speed, displaying a sequence of images corresponding to the video and corresponding to the speed of the current data point being dragged until the current data point is no longer dragged along the track bar, and then continuing to playback the video.

8. The method of claim 1, wherein the graphic user interface displays a name of the video being played back.

9. The method of claim 1, wherein the graphic user interface displays a time corresponding to the current data point.

10. A non-transitory computer readable medium storing instructions that, when executed by a processor, cause the processor to perform steps comprising:
   displaying a video for a playback on a display device at a playback speed;
   providing a graphic user interface on the display device, the graphic user interface including a track bar with a current data point;
   determining a speed of the current data point being dragged along the track bar by a user via a user input mechanism; and
   in response to determining that the speed of the current data point being dragged along the track bar by the user via the user input mechanism is greater than a particular speed, displaying a default image until the current data point is no longer dragged along the track bar, and then continuing to playback the video, wherein the particular speed is at least twice the playback speed.

11. The computer readable medium of claim 10, wherein the track bar provides an available data feature indicating an amount of data of the video available for the playback.

12. The computer readable medium of claim 11, wherein the available data feature grows as the amount of data of the video available for the playback increases.

13. The computer readable medium of claim 10, further storing instructions that cause the processor to display the video by streaming the video from a network.

14. The computer readable medium of claim 10, further storing instructions that cause the processor to display the video by playing back the video that is locally stored in a memory resource.

15. The computer readable medium of claim 10, wherein the graphic user interface displays a current time and a time the video is predicted to finish the playback.

16. The computer readable medium of claim 10, further storing instructions that cause the processor, in response to determining that the speed of the current data point is not greater than the particular speed, to display a sequence of images corresponding to the video and corresponding to the speed of the current data point being dragged until the current data point is no longer dragged along the track bar, and then continue to playback the video.

17. The computer readable medium of claim 10, wherein the graphic user interface displays a name of the video being played back.

18. The computer readable medium of claim 10, wherein the graphic user interface displays a time corresponding to the current data point.

19. A device comprising:
   a display screen;
   a processor coupled to the display screen, the processor being configured to:
      display a video for a playback on the display screen at a playback speed;
      provide a graphic user interface on the display screen, the graphic user interface including a track bar with a current data point;
      determine a speed of the current data point being dragged along the track bar by a user via a user input mechanism; and
      in response to determining that the speed of the current data point being dragged along the track bar by the user via the user input mechanism is greater than a particular speed, display a default image until the current data point is no longer dragged along the track bar, and then continue to playback the video, wherein the particular speed is at least twice the playback speed.

20. The device of claim 19, wherein the processor is configured to display the video by streaming the video from a network.

* * * * *